US011769040B2

(12) United States Patent
Shao et al.

(10) Patent No.: US 11,769,040 B2
(45) Date of Patent: Sep. 26, 2023

(54) SCALABLE MULTI-DIE DEEP LEARNING SYSTEM

(71) Applicant: NVIDIA Corp., Santa Clara, CA (US)

(72) Inventors: Yakun Shao, Santa Clara, CA (US); Rangharajan Venkatesan, San Jose, CA (US); Nan Jiang, St. Louis, MO (US); Brian Matthew Zimmer, Mountain View, CA (US); Jason Clemons, Leander, TX (US); Nathaniel Pinckney, Cedar Park, TX (US); Matthew R Fojtik, Chapel Hill, NC (US); William James Dally, Incline Village, NV (US); Joel S. Emer, Acton, MA (US); Stephen W. Keckler, Austin, TX (US); Brucek Khailany, Austin, TX (US)

(73) Assignee: NVIDIA CORP., Santa Clara, CA (US)

( * ) Notice: Subject to any disclaimer, the term of this patent is extended or adjusted under 35 U.S.C. 154(b) by 892 days.

(21) Appl. No.: 16/517,431

(22) Filed: Jul. 19, 2019

(65) Prior Publication Data

US 2020/0082246 A1    Mar. 12, 2020

Related U.S. Application Data

(60) Provisional application No. 62/729,066, filed on Sep. 10, 2018.

(51) Int. Cl.
*G06F 7/02*     (2006.01)
*G06N 3/049*    (2023.01)
(Continued)

(52) U.S. Cl.
CPC ......... *G06N 3/049* (2013.01); *G06F 9/44505* (2013.01); *G06F 9/544* (2013.01); *G06N 3/082* (2013.01)

(58) Field of Classification Search
CPC ........ G06N 3/049; G06N 3/082; G06N 3/063; G06N 3/0481; G06F 9/44505; G06F 9/544
See application file for complete search history.

(56) References Cited

U.S. PATENT DOCUMENTS 5,008,833 A    4/1991  Agranat et al.
5,091,864 A    2/1992  Baji et al.
(Continued)

FOREIGN PATENT DOCUMENTS

CN    107463932 A    12/2017

OTHER PUBLICATIONS

Kartik Hegde et al. "UCNN: Exploiting Computational Reuse in Deep Neural Networks via Weight Repetition", Apr. 18, 2018. (Year: 2018).*

(Continued)

*Primary Examiner* — Timothy A Mudrick
*Assistant Examiner* — Abdou K Seye
(74) *Attorney, Agent, or Firm* — Rowan TELS LLC

(57) ABSTRACT

A distributed deep neural net (DNN) utilizing a distributed, tile-based architecture implemented on a semiconductor package. The package includes multiple chips, each with a central processing element, a global memory buffer, and processing elements. Each processing element includes a weight buffer, an activation buffer, and multiply-accumulate units to combine, in parallel, the weight values and the activation values.

19 Claims, 12 Drawing Sheets

(51) Int. Cl.
*G06F 9/445* (2018.01)
*G06F 9/54* (2006.01)
*G06N 3/082* (2023.01)

(56) References Cited

U.S. PATENT DOCUMENTS

| | | | |
|---|---|---|---|
| 5,297,232 A | 3/1994 | Murphy | |
| 5,319,587 A | 6/1994 | White | |
| 5,704,016 A | 12/1997 | Shigematsu et al. | |
| 5,768,476 A | 6/1998 | Sugaya et al. | |
| 6,560,582 B1 | 5/2003 | Woodall | |
| 7,082,419 B1 | 7/2006 | Lightowler | |
| 10,817,260 B1* | 10/2020 | Huang | G06F 7/523 |
| 10,929,746 B2* | 2/2021 | Litvak | G06F 7/5443 |
| 2003/0061184 A1 | 3/2003 | Masgonty et al. | |
| 2009/0210218 A1 | 8/2009 | Collobert et al. | |
| 2018/0004689 A1 | 1/2018 | Marfatia et al. | |
| 2018/0046897 A1 | 2/2018 | Kang et al. | |
| 2018/0121796 A1 | 5/2018 | Deisher et al. | |
| 2018/0173676 A1* | 6/2018 | Tsai | G06F 17/16 |
| 2019/0050717 A1 | 2/2019 | Temam et al. | |
| 2019/0138891 A1 | 5/2019 | Kim et al. | |
| 2019/0179975 A1* | 6/2019 | Rassekh | G06F 30/327 |
| 2019/0180170 A1* | 6/2019 | Huang | G06F 15/80 |
| 2019/0340510 A1 | 11/2019 | Li et al. | |
| 2019/0370645 A1 | 12/2019 | Lee et al. | |
| 2019/0392287 A1* | 12/2019 | Ovsiannikov | G06N 3/08 |
| 2021/0004668 A1 | 1/2021 | Moshovos et al. | |
| 2021/0125046 A1* | 4/2021 | Moshovos | G06F 7/5443 |

OTHER PUBLICATIONS

Duckhwan Kim et al. "Neurocube: A Programmable Digital Neuromorphic Architecture with High-Density 3D Memory", (Year: 2016).*

Angshuman Parashar et al. "SCNN: An Accelerator for Compressed-sparse Convolutional Neural Networks", (Year: 2017).*
Eunhyeok Park et al. "Energy-efficient Neural Network Accelerator Based on Outlier-aware Low-precision Computation", Jun. 1, 2018 (Year: 2018).*
U.S. Appl. No. 16/517,431, filed Jul. 19, 2019, Yakun Shao.
Andri, YodaN N: An Ultra-Low Power Convolutional Neural Network Accelerator Based on Binary Weights, IEEE, pp. 238-241 (Year: 2016).
F. Sijstermans. The NVIDIA deep learning accelerator. In Hot Chips, 2018.
Han, EIE: Efficient Inference Engine on Compressed Deep Neural Network, IEEE, pp. 243-254 (Year: 2016).
K. Kwon et al. Co-design of deep neural nets and neural net accelerators for embedded vision applications. In Proc. DAC, 2018.
N. P. Jouppi et al. In-datacenter performance analysis of a tensor processing unit. In Proc. ISCA, 2017.
T. Chen et al. DianNao: A small-footprint high-throughput accelerator for ubiquitous machine-learning. In Proc. ASPLOS, 2014.
W. Lu et al. FlexFlow: A flexible dataflow accelerator architecture for convolutional neural networks. In Proc. HPCA, 2017.
Y. Chen, J. Emer, and V. Sze. Eyeriss: A spatial architecture for energy-efficient dataflow for convolutional neural networks. In Proc. ISCA, 2016.
Yavits, Leonid, Amir Morad, and Ran Ginosar. "Sparse matrix multiplication on an associative processor." IEEE Transactions on Parallel and Distributed Systems 26.11 (2014): 3175-3183. (Year: 2014).
Streat, Lennard, Dhireesha Kudithipudi, and Kevin Gomez. "Non-volatile hierarchical temporal memory: Hardware for spatial pooling." arXiv preprint arXiv:1611.02792 (2016). (Year: 2016).

* cited by examiner

SCALABLE MULTI-DIE DEEP LEARNING SYSTEM

CROSS-REFERENCE TO RELATED APPLICATIONS

This application claims priority and benefit under 35 U.S.C. 119(e) to U.S. Application Ser. No. 62/729,066, filed on Sep. 10, 2018, the contents of which are incorporated herein by reference in their entirety.

GOVERNMENT LICENSE RIGHTS

This invention was made with US Government support under Agreement HR0011-16-3-0003, awarded by DARPA. The US Government has certain rights in the invention.

BACKGROUND

Deep neural networks (DNNs) are a class of neural network that has emerged as a key approach for solving complex problems across various technical fields. "Neural network" refers to an algorithm or computational system based on a collection of connected units or nodes called artificial neurons, which loosely model the neurons in a biological system. Each connection between neurons, like the synapses in a biological brain, can transmit a signal (an activation) from one artificial neuron to another. An artificial neuron that receives a signal (the input activation) can process it and then signal additional artificial neurons (the output activation) connected to it. Applications of DNNs have diverse performance, accuracy, and power constraints, depending on the implementation. Building dedicated DNNs for the constraints of particular implementations may be cost prohibitive due to high design complexity and manufacturing challenges.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Deep neural networks (DNNs) are intrinsically scalable, enabling a unified DNN architecture with utility to many different implementation constraints. Disclosed herein is an efficient, tiled DNN processor that utilizes a scalable multi-die package design. The dice (more than one die are referred to herein as "dice") are inter-connected and communicate via packet-switched network-on-a-package router, and the processing elements of each die and inter-connected and communicate via network-on-a-chip routers.

The disclosed system comprises beneficial features including: 1) a fully distributed, tile-based architecture, 2) low-energy, high-bandwidth ground reference signaling (GRS) transceivers for inter-die communication; and 3) flexible and efficient weight and activation tiling at the processing element (PE) level, die-level, and package-level, improving data locality and reducing communication cost.

Figure 1:
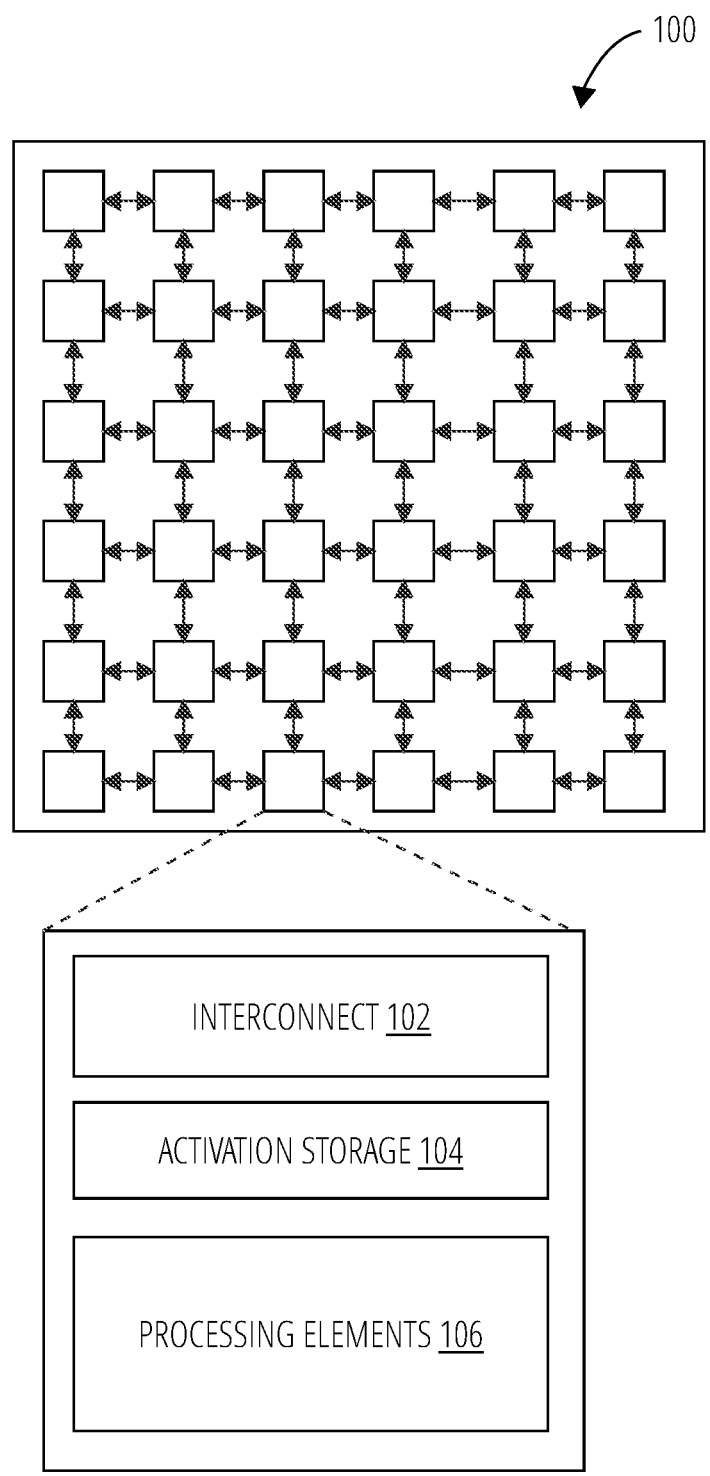
FIG. 1 illustrates a scalable neural processor 100 in accordance with one embodiment.

FIG. 1 illustrates a scalable neural processor 100 in one embodiment. Weights for a DNN are tiled spatially across on-die memories (activation storage 104). "Weights" refers to values with which activations are multiplied to increase or decrease the impact of the activation values in an activation function. The weights may be partitioned among any number of dice, for example 1-36 dice. As depicted, FIG. 1 comprises 36 dice. Ground reference signaling (GRS) transceivers may be utilized to implement an interconnect 102 among processing elements 106 on different dice. The scalable neural processor 100 may be implemented by multiple dice communicating via transceivers in a single package. The transceivers may also be utilized to communicate between dice on multiple packages.

DNN inference accelerator applications can differ significantly in their demands. For example, typical data center inference applications such as image recognition may prioritize performance and scalability at low latency and may be willing to sacrifice classification accuracy, while DNN inference for autonomous driving workloads may prioritize energy efficiency within real-time constraints while maintaining the best achievable network accuracy. Because custom inference accelerators can offer significant performance and power advantages compared to general-purpose processors and FPGAs, it is desirable to enable custom accelerator hardware instances for each target market and range of supported workloads. However, the high engineering cost and long design cycles of custom hardware design makes this challenging.

Figure 2:
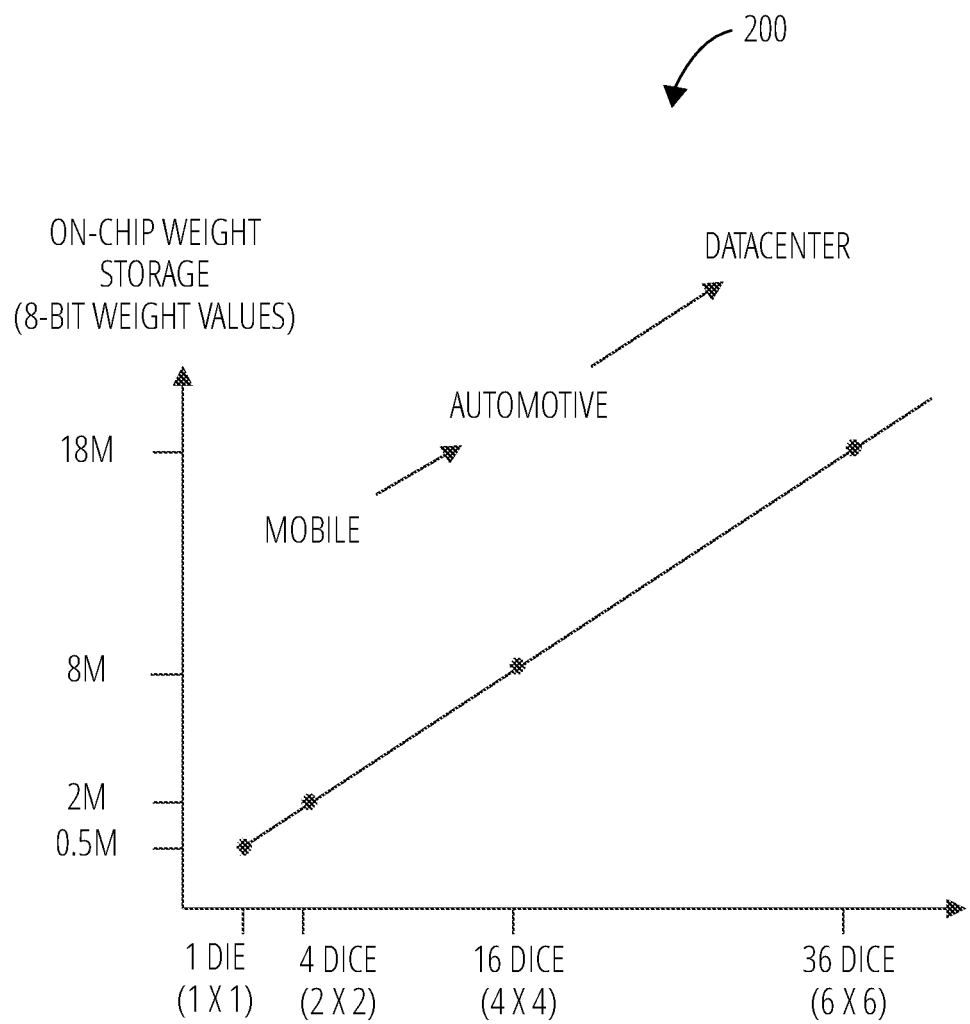
FIG. 2 illustrates weight storage requirements 200 for a variety of DNN applications.

FIG. 2 illustrates how the number of dice and weight storage requirements 200 of a DNN processor may scale across mobile, automotive, and data center applications. For example, a package with four dice (2×2 arrangement) may have an on-chip weight storage of about 2 MB. "Chip" refers to a collection of circuits in a discrete package with a set of pins (input and output terminals typically made of metal) for interfacing with the circuits within the chip. A chip is also referred to herein as a 'die'. Such a package may be utilized in mobile applications. A package with 16 dice (4×4 arrangement) may have an on-chip weight storage of about 8 MB. Such a package may be utilized in automotive applications. A package with 36 dice (6×6 arrangement) may have an on-chip weight storage of about 18 MB. Such a package may be utilized in datacenter applications. The storage requirements are thus essentially linear with number of dice utilized.

Figure 3:
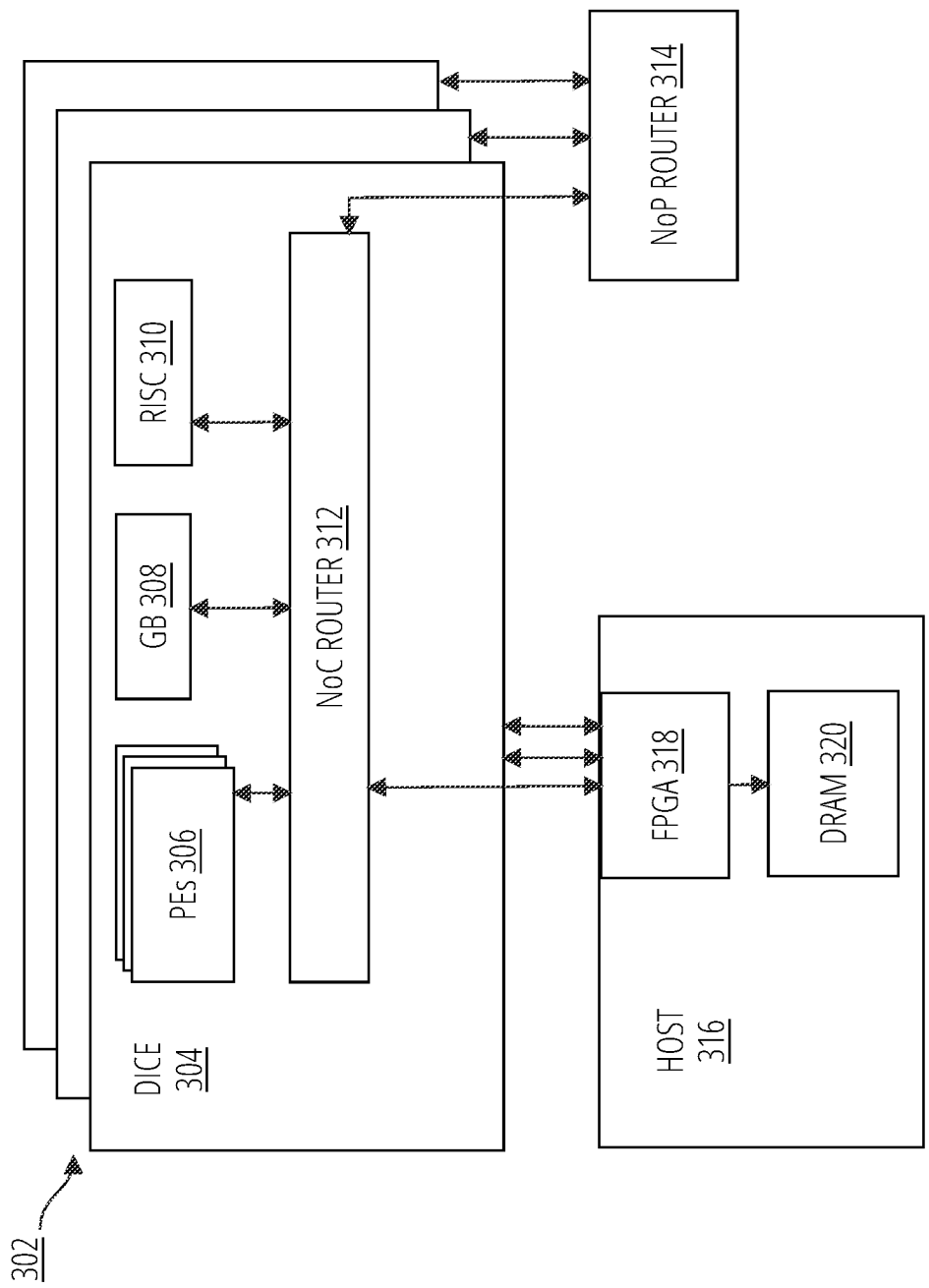
FIG. 3 illustrates a multi-die package 302 in accordance with one embodiment.

Referring to the multi-die package 302 embodiment of FIG. 3. The multi-die package 302 may be a semiconductor package comprising a plurality of dice 304. Each of the dice 304 comprises a plurality of processing elements 306, a global buffer 308, and a controller 310. Herein, the term "chip" is used interchangeably with the term "die". The elements of each chip/die communicate via a network-on-a-chip router 312. The multiple chips in a package communicate with one another via a network-on-a-package router 314, and may also communicate with a host 316 system comprising DRAM 320 or other memory, via a Field Programmable Gate Array (FPGA 318), Joint Test Action Group (JTAG) logic, or other interface technology as known in the art.

Each of the processing elements comprises a weight buffer to receive and store weight values for a deep neural network. "Weight buffer" refers to a buffer storing weight values. Each of the processing elements comprises an activation buffer to receive activation values for the deep neural network. "Activation buffer" refers to a memory buffer utilized to store activation values (activations) utilized in a neural network computation. Activations are computed by each neuron in a neural network layer using an activation function, also sometimes called a 'transfer function'. Activations may be simple binary values (e.g., "1" or "0" representing "ON" or "OFF") or they may take on a range of values for some activation functions. The weight buffer and activation buffer may be separate elements within each processing element. "Activations" refers to the output values of neurons in a neural network, computed based at least in part on weights input to the neuron and an activation function of the neuron. Activations are also called 'activation values'. "Buffer" refers to a memory storing values that are inputs to or results from a calculation. Each of the processing elements further comprises a plurality of multiply-accumulate units to combine, in parallel, the weight values and the activation values, to generate partial sums.

The multi-die package 302 is configured to distribute the weight values and the activation values among the processing elements spatially by a depth of an input (e.g., the color depth of a digital image) to the deep neural network, and temporally (over time) by a height and a width of the input (e.g., the height and width of the digital image) to the deep neural network. The global memory buffer of each chip may act as a second-level buffer for the activation values during computation. "Second-level buffer" refers to a memory where values are stored and retrieved from when the values are needed for computation but aren't available in the first-level buffer. Herein, the chip global buffer may act as a second-level buffer to the first-level activation buffers of the chip's processing elements. "Global memory buffer" refers to a buffer available for utilization by all or at least a plurality of processing elements on a chip. The distribution of weights and activations during computation may be carried out by the chip's controller 310.

Figure 4:
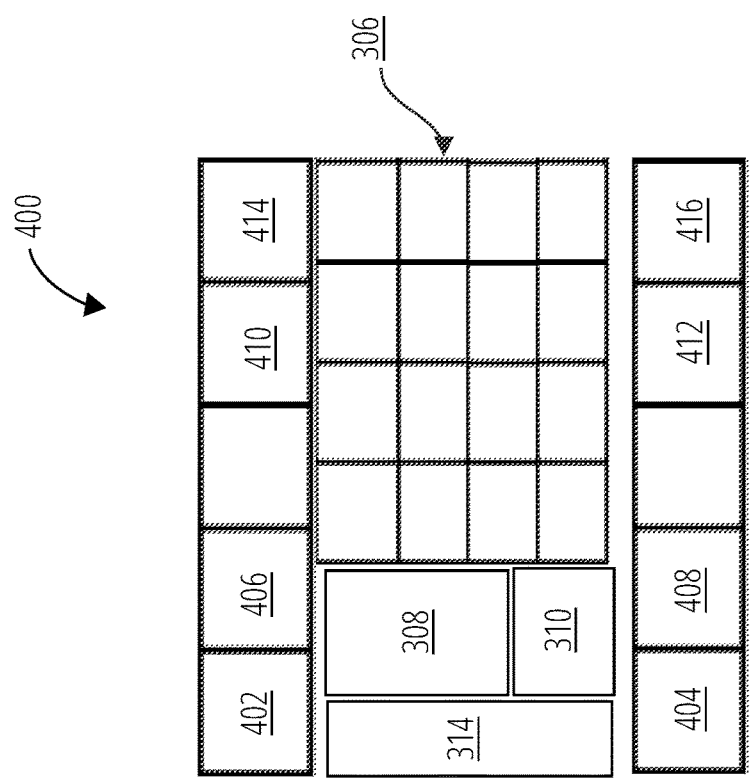
FIG. 4 illustrates a die 400 in accordance with one embodiment.

FIG. 4 illustrates a die 400 in one embodiment utilizing an 8-bit fixed point data path and a plurality (e.g., 16) of processing elements 306. The die 400 comprises the aforementioned global buffer 308 and controller 310, which for example may be a RISC-V processor. The processing elements 306 and global buffer 308 communicate via the network-on-a-chip router 312, which may be implemented centrally or in distributed fashion as routers on each of the processing elements 306. The processing elements 306 communicate with processing elements on other dice via the network-on-a-package router 314 and various transceivers—west GRS receiver 402, west GRS transmitter 404, north GRS transmitter 406, south GRS receiver 408, north GRS receiver 410, south GRS transmitter 412, east GRS transmitter 414, and east GRS receiver 416.

The transceivers as depicted are implemented using ground-referenced-signaling-based (GRS) transceivers, where four are configured as receivers (RX) and four as transmitters (TX). In one embodiment, each transceiver may comprise four data lanes and one clock lane. Each package may for example include from one to 36 dice coupled in a mesh network, where the network-on-a-package router 314 of each die communicates directly with its four neighboring dice. When the die-to-die communication links are not active, they may be placed a sleep mode by turning off the data lanes entirely, saving energy and incurring a low wake-up latency. The mesh topology may be preferred over more complex topologies, such as a folded two-dimensional torus, which would require an increase in die-to-die spacing to accommodate the additional wiring length.

Figure 5:
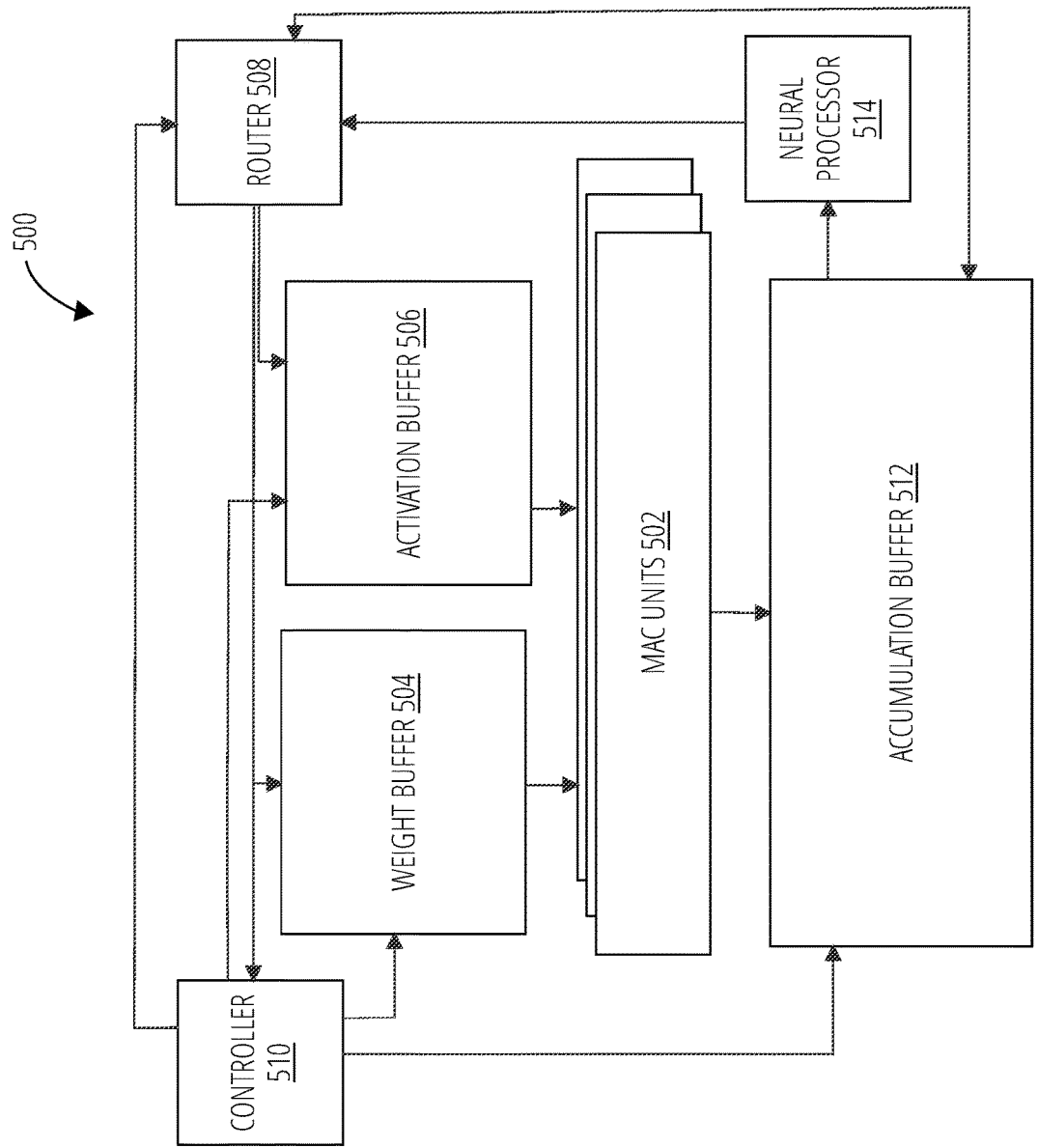
FIG. 5 illustrates a processing element 500 in accordance with one embodiment.

FIG. 5 depicts, and a high level, an exemplary processing element 500. The processing element 500 includes a plurality of multiply-accumulate units 502, a weight buffer 504, an activation buffer 506, a router 508, a controller 510, an accumulation memory buffer 512, and a neural processor 514. The activation buffer 506 may, in one embodiment, be implemented as a dual-ported SRAM to receive activation values from the chip's central controller 310 or from other processing elements, via the router 508. The router 508 may be a component of a distributed network-on-a-chip router 312.

The weight buffer 504 may, in one embodiment, be implemented as a single-ported 32 KB SRAM storing weigh values. The weight values used by the multiply-accumulate units 502 may be "weight-stationary", meaning they are not updated each clock cycle, but instead are updated only after the output activation values are computed for a particular layer of the deep neural network.

The accumulation memory buffer 512 may comprise one or more SRAM device to store the output activations computed by the multiply-accumulate units 502. The router 508 communicates these output activations and control signals from the processing element 500 to other processing elements. "Output activation" refers to an activation output by a neuron in a neural network. An output activation is typically computed based on the input activations to the neuron and the weights applied to the input activations. "Input activation" refers to an activation received by a neuron in a neural network.

The processing element 500 may perform all operations of convolutional and fully-connected layers of a DNN efficiently, including multiply-accumulate, truncation, scaling, bias addition, ReLU, and pooling (these last five in the neural processor 514). The multiply-accumulate units 502 may operate on the same inputs using different filters. In one embodiment, each of the multiply-accumulate units 502 performs an eight-input-channel dot product and accumulates the result into the accumulation memory buffer 512 on each clock cycle. The weights stored in the weight buffer 504 are unchanged until the entire computation of output activations completes. Each processing element 500 reads the input activations in the activation buffer 506, performs the multiply-accumulate operations, and writes output activations to the accumulation memory buffer 512 on every clock cycle. The frequency at which the weight buffer 504 is accessed depends on the input activation matrix dimensions and the number of filters utilized.

The multiply-accumulate units 502 of each processing element 500 computes a portion of a wide dot-productaccumulate as a partial result and forwards the partial result to neighboring processing elements. "Dot-product-accumulate" refers to the computation of a dot product. A dot product is the sum of the products of the corresponding entries of the two sequences (vectors) of numbers. Dot products are efficiently computed using multiply-accumulate units. "Multiply-accumulate unit" refers to a data processing circuit that carries out multiply-accumulate operations, which involve computing the product of two numbers and adding that product to an accumulator. Multiply-accumulate units may be referred to herein by their acronym, MAC or MAC unit.

$$a \leftarrow a+(b \times c)$$

MAC Computation

The partial results are transformed into a final result by the processing elements and communicated to the global buffer. The global buffer acts as a staging area for the final multiply-accumulate results between layers of the deep neural network.

The accumulation memory buffer 512 receives outputs from the multiply-accumulate units 502. The central controller 310 distributes the weight values and activation values among the processing elements and utilizes the global memory buffer as a second-level buffer for the activation values. The controller 310 decomposes processing by layers of the deep neural network spatially across the processing elements by input/output channel dimensions, and temporally by image height/width.

The global buffer 308 stores both input activations and output activations from the processing elements 306 for distribution by the aforementioned transceivers to the processing elements via multicast. "Multicast" refers to a group communication mechanism whereby transmission of data is addressed to a group of destination devices (e.g., processing elements) simultaneously. Multicast can implement one-to-many or many-to-many distribution. Each of the processing elements 306 includes a router 508 to communicate, in one embodiment, 64 bits of data in, and 64 bits of data out, per clock cycle. This enables accumulation of partial sums for wide dot products that have their computation spatially tiled across the processing elements 306.

Figure 6:
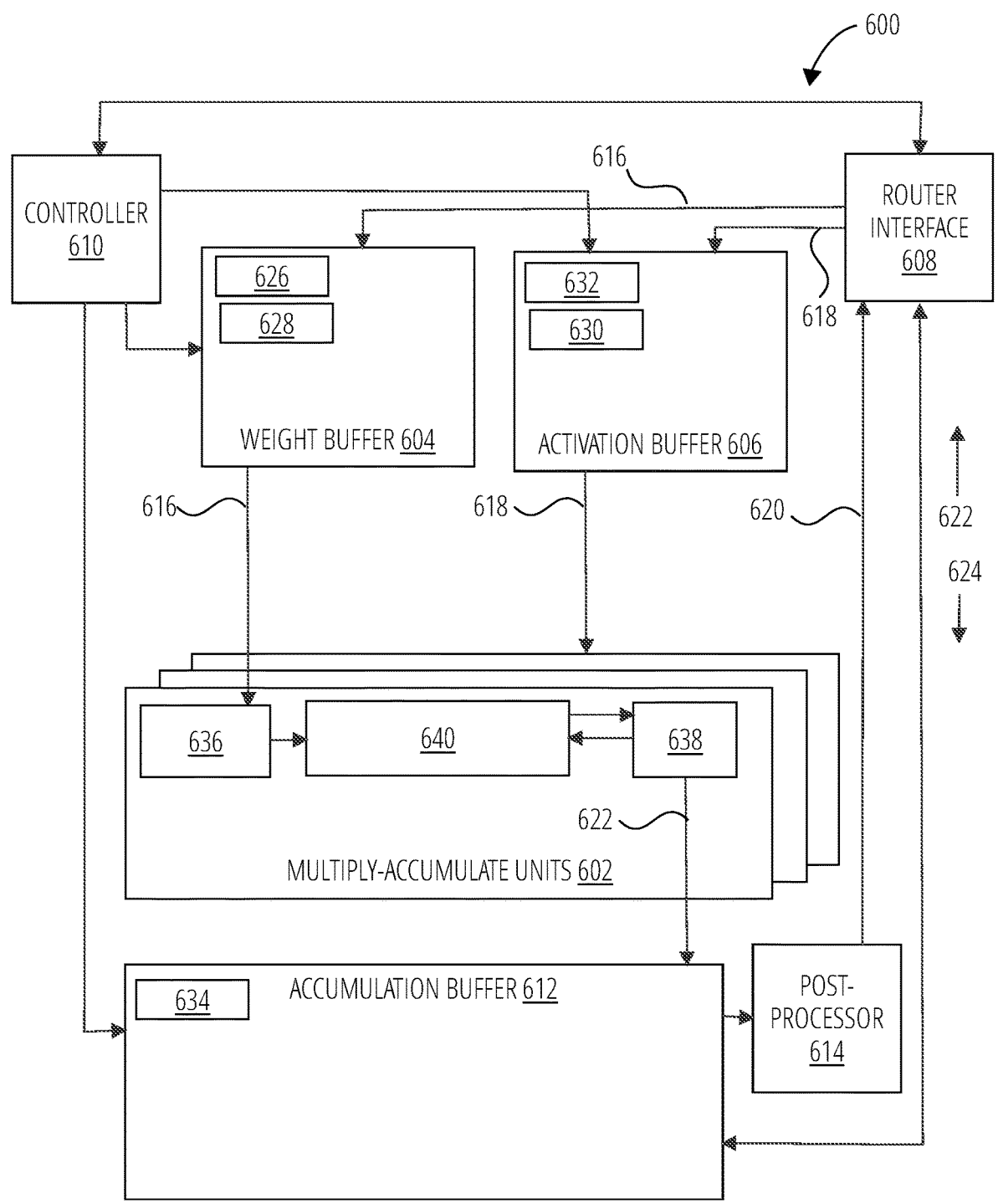
FIG. 6 illustrates a processing element 600 in accordance with one embodiment.

FIG. 6 depicts an exemplary processing element 600 in more detail. The processing element 600 includes the aforementioned vector MAC units 602, weight buffer 604, activation buffer 606, router interface 608, controller 610, accumulation memory buffer 612, and post-processor 614 (e.g., the neural processor 514). Also depicted are a weight collector 636 interposed between the weight buffer 604 and the vector MAC units 602, and an accumulation collector 638 interposed between the vector MAC units 602 and the accumulation memory buffer 612. Also depicted are various memory buffer managers that may be utilized (e.g., weight memory buffer manager 626, activation memory buffer manager 632, and accumulation memory buffer manager 634). "Memory buffer manager" refers to logic for managing the contents of a memory buffer, for example managing the availability of certain data (e.g., weights, activations) in the buffer when requested by a processing element.

The processing element 600 includes multiple vector MAC units 602, of which a number N are operational for a given data flow. Each of the vector MAC units 602 performs V multiplications and additions per clock cycle using its multiply accumulate unit 640. Thus, in every clock cycle, the processing element 600 can multiple a weight matrix of dimensions N×V with an input activation matrix of size V, to generate a partial-sum vector of size N. In other words, each of the vector MAC units 602 can perform a V-wide dot product calculation per clock cycle. One or both N and V may be configurable at the controller 310.

The input activation buffer 606 has an operational size IA and the weight buffer 604 has an operational size W. One or both W and IA may be configurable at the controller 310. The accumulation memory buffer 612 has an operational size of A. "Operational size" refers to a resource pool available for performing calculations during operation of a device, which may be less than the total or maximum size of the resource pool. The operational size may be configurable using registers or other settings (e.g., for higher performance or less power consumption).

Each of the vector MAC units 602 includes a weight collector 636 buffer having a depth (e.g., number of distinct registers or addresses in a register file) of WD and a width WP (also called the weight precision). The input activations have width IAP. Each of the vector MAC units 602 also includes an accumulation collector 638 having depth AD and width AP (also called the accumulator precision). The V-wide dot products and N-sized partial-sum vector may thus be computed by each multiply accumulate unit 640 at mixed precision. Some or all of WD, WP, IAP, AD, and AP may be configurable at the controller 310.

The weight buffer 604 read (output) port is WP×N×V bits wide and is able to supply different weight vectors to different ones of the vector MAC units 602. The activation buffer 606 is IAP×V bits wide because the same IA vector is provided in parallel to all N vector MAC units 602.

The values of V and N may be adjusted for more or less parallelism and reuse of weights, for example. Based on the configuration of N and V, other parameters such as W, IA, and A may be adjusted to ensure the vector MAC units 602 stay busy during convolution calculation.

The weight buffer 604 and the activation buffer 606 each have an associated address generator (address generator 628 and address generator 630, respectively) that generates an address every cycle. "Address generator" refers to logic that calculates address values in a memory for reading or writing data from the address. The ordering of operations carried out by the vector MAC units 602 is controlled by these address generators, which are configurable to support temporal reuse of weights or results in the accumulation collector 638 across clock cycles for different types of data flows. The depth WD of the weight collector 636 may be configurable to enable different amounts of temporal reuse of weight values, depending on the requirements of the data flow. Likewise, the depth AD of the accumulation collector 638 may be configurable to enable different amounts of temporal reuse of partial sums, depending on the requirements of the data flow.

Each of the weight buffer 604 and activation buffer 606 also have a buffer manager (weight memory buffer manager 626 and activation memory buffer manager 632, respectively) responsive to the controller 610 and determining the availability of data to the vector MAC units 602. The dimensions of the address generators and the granularity of data movement from the weight buffer 604 and activation buffer 606 to the vector MAC units 602 may in some embodiments be configurable at the controller 310 or automatically determined based on other factors such as N and v.

The accumulation memory buffer 612 stores partial sums from all N vector MAC units 602 and may be optimized to perform read-modify-write operations every cycle. Partial sums from the N vector MAC units 602 are packed into vectors of width AP×N and stored in the accumulation memory buffer 612. From there, they can be sent either directly to another processing element for cross-processing element reduction or to the post-processor 614 to produce final output activations. The post-processor 614 supports not only scaling and quantization but also ReLU and pooling operations to enable layer fusion.

Input weights 616 arrive over the router interface 608 and are stored in the weight buffer 604. Input activations 618 also arrive over the router interface 608 are are stored in the activation buffer 606. Computed output activations 620 (after post-processing by the post-processor 614) or partial sums 622 from the accumulation memory buffer 612 are output to the global buffer 308 or neighboring processing elements, respectively, via the router interface 608. Cross-processing-element reductions 624 from said neighboring processing elements may be received by the router interface 608 and are stored in the accumulation memory buffer 612.

Figure 7:
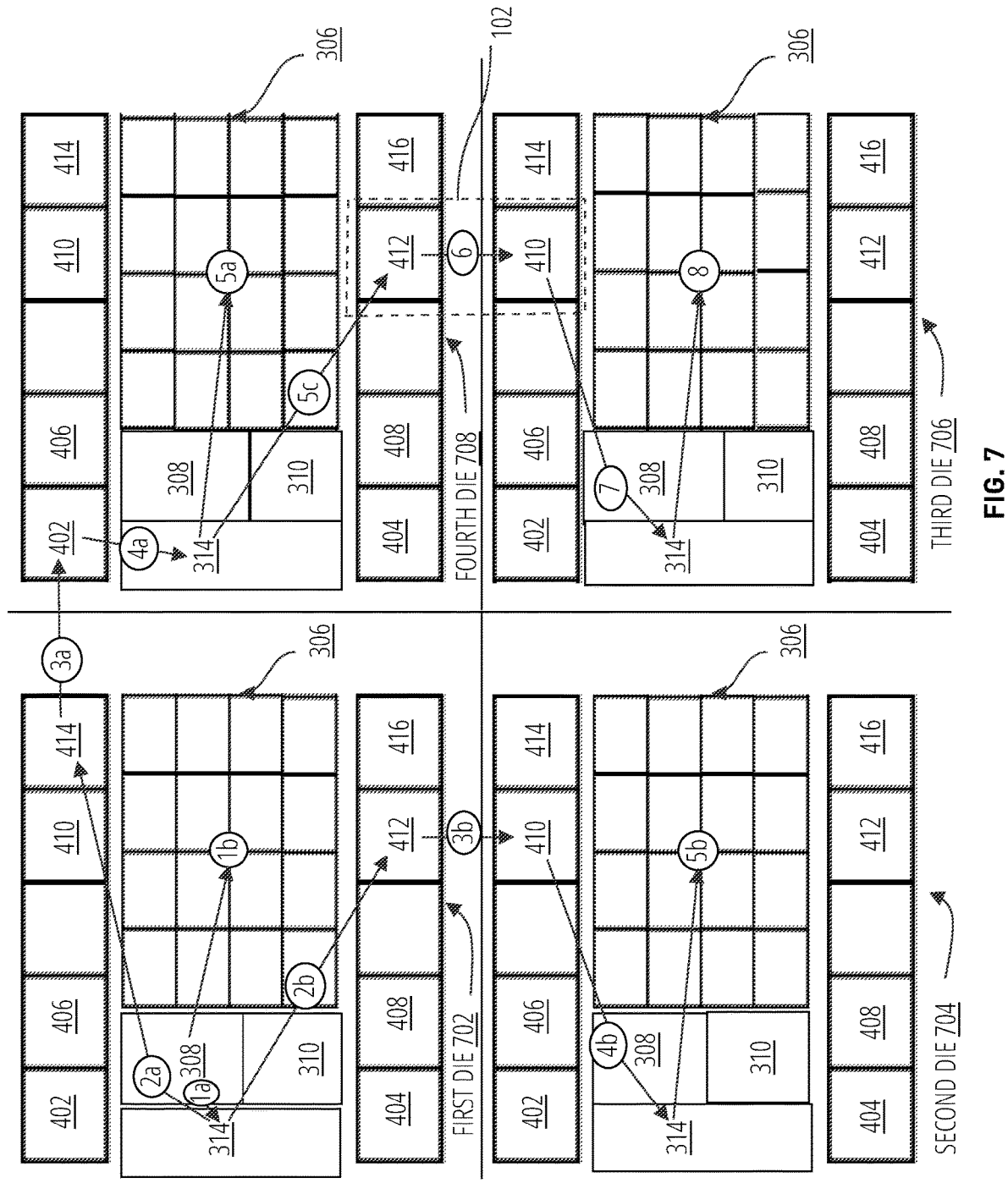
FIG. 7 illustrates an exemplary data flow between processing elements 306 on different dice.
Figure 8:
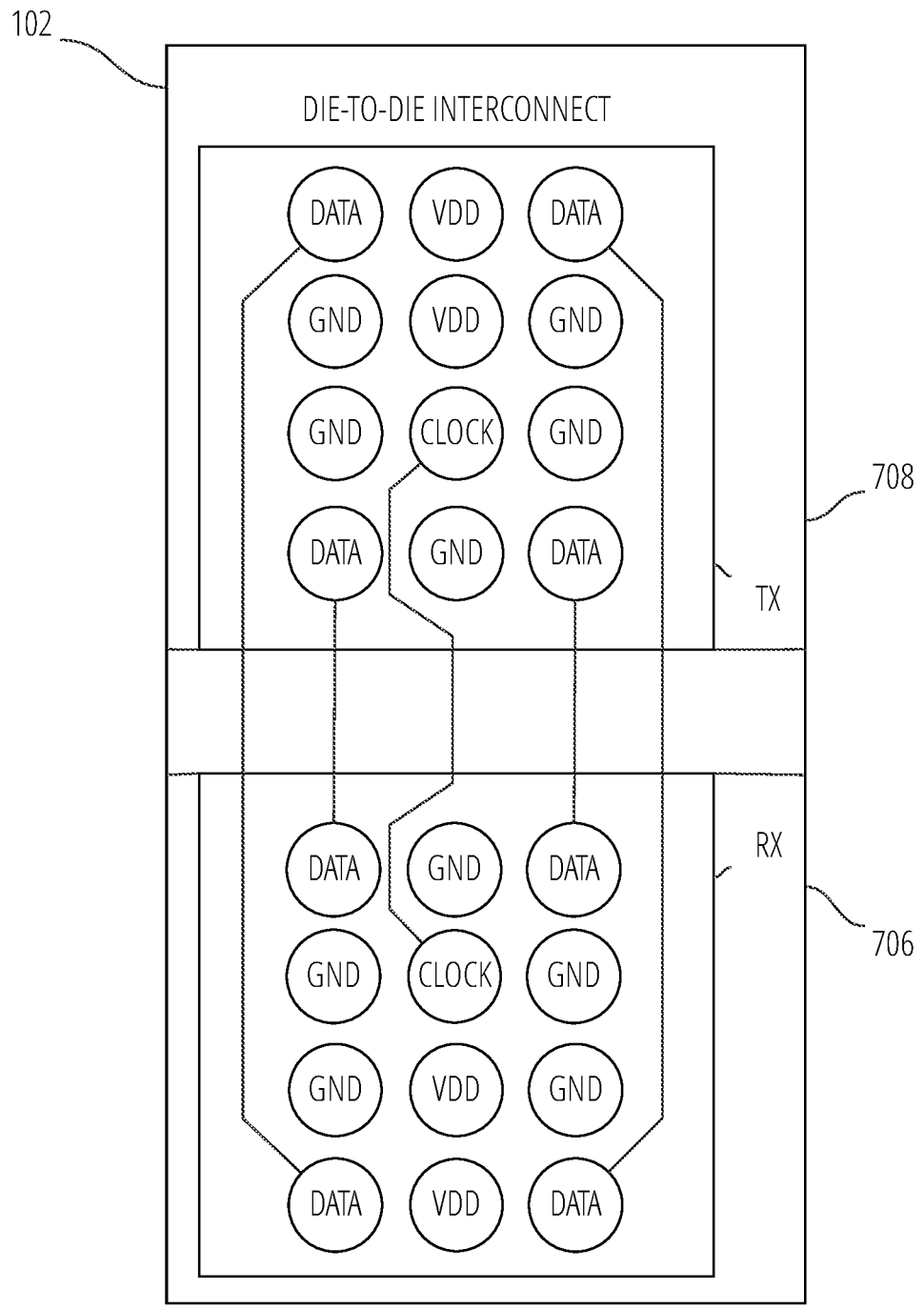
FIG. 8 illustrates an interconnect 102 in accordance with one embodiment.
Figure 9:
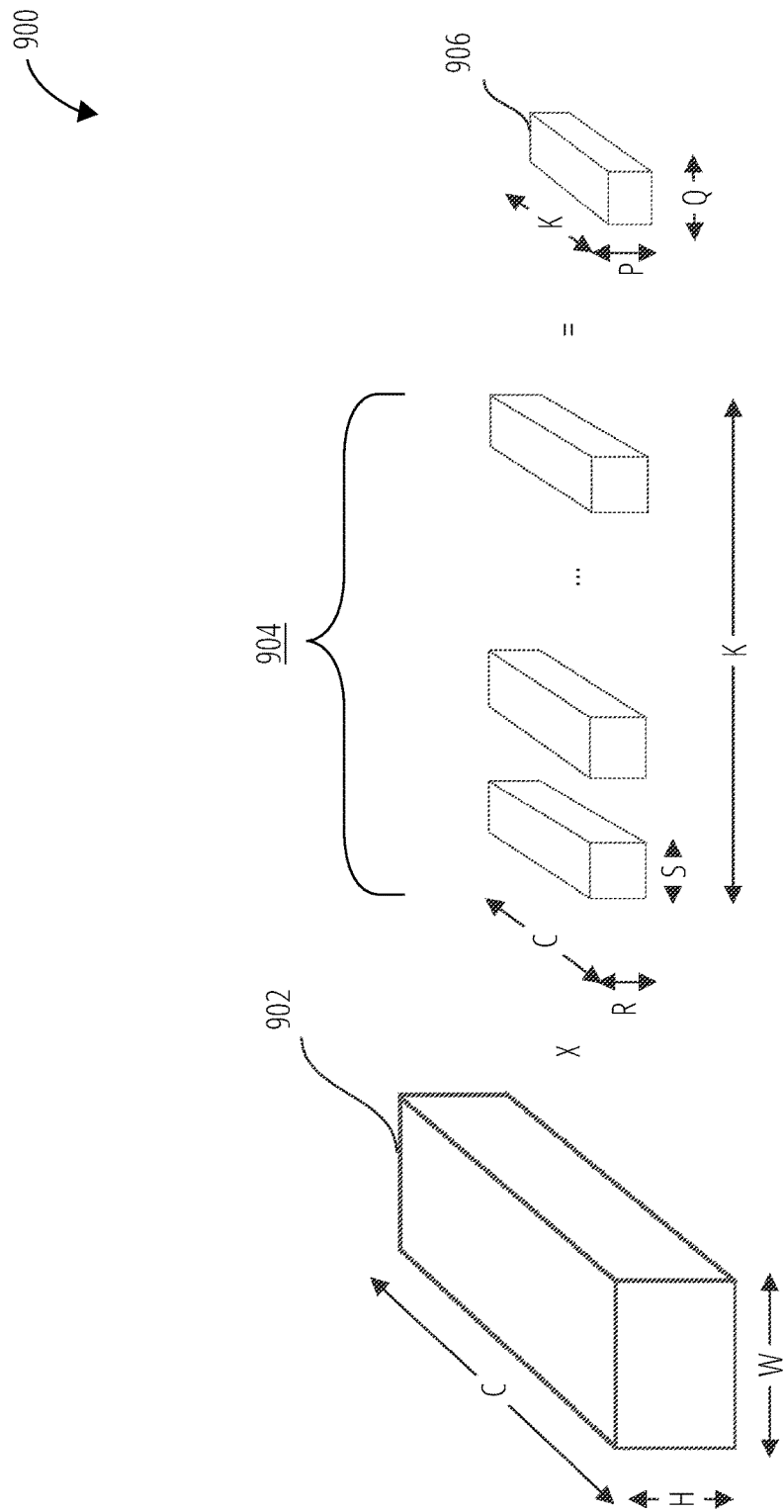
FIG. 9 illustrates convolution tiling 900 in accordance with one embodiment.

FIG. 7 depicts exemplary input activation flows in a multi-die package 302 comprising a first die 702, a second die 704, a third die 706, and a fourth die 708. An exemplary interconnect 102 between the third die 706 and the fourth die 708 is illustrated in FIG. 8. The data flows are described below for activation values; a similar process may be utilized to distribute weight values to the processing elements of the different dice.

Each of the global buffer 308, the controller 310, and the processing elements 306 may comprise a network-on-a-chip. The combination of the west GRS receiver 402, the west GRS transmitter 404, the north GRS transmitter 406, the south GRS receiver 408, the north GRS receiver 410, the south GRS transmitter 412, the east GRS transmitter 414, and the east GRS receiver 416 from each chip may form a network-on-a-package router 314.

An exemplary multicast of an input activation by the first die 702 is depicted. Steps with the same number may occur approximately simultaneous, such as on the same clock cycle. First, the global buffer 308 of the first die 702 sends input activations to the network-on-a-package router 314 (step 1a). Some of these input activations may be distributed via multicast to the second die 704, the third die 706, and the fourth die 708. The global buffer 308 simultaneously communicates some of these input activations to the processing elements 306 of the first die 702 (step 1b). These are input activations to be processed by the processing elements 306 of the first die 702.

The network-on-a-package router 314 of the first die 702 then communicates the input activations via the east GRS transmitter 414 (step 2a) and the south GRS transmitter 412 (step 2b). The input activations sent to the east GRS transmitter 414 of the first die 702 may be the input activations for the fourth die 708 and the third die 706. The input activations sent to the south GRS transmitter 412 of the first die 702 may be the input activations for the second die 704.

The east GRS transmitter 414 of the first die 702 sends the input activations to the west GRS receiver 402 of the fourth die 708 (step 3a), and the south GRS transmitter 412 of the first die 702 sends the input activations to the north GRS receiver 410 of the second die 704 (step 3b). The input activations are further sent from the west GRS receiver 402 of the fourth die 708 to the network-on-a-package router 314 (step 4a) and from the north GRS receiver 410 of the second die 704 to the network-on-a-package router 314 (step 4b).

The network-on-a-package router 314 of the fourth die 708 sends the input activations to the processing elements 306 of the fourth die 708 (step 5a) and to the south GRS transmitter 412 of the fourth die 708 (step 5c). The input activations sent to the processing elements 306 of the fourth die 708 may be those input activations for the processing elements 306 of the fourth die 708 to utilize. The input activations sent to the south GRS transmitter 412 of the fourth die 708 may be those input activations for the processing elements 306 of the third die 706 to utilize. The network-on-a-package router 314 also sends the input activations to the processing elements 306 of the second die 704 to be utilized (step 5b).

The south GRS transmitter 412 of the fourth die 708 sends the input activations to the north GRS receiver 410 of the third die 706 (step 6). These input activations are then sent to the processing elements 306 of the third die 706.

Within each die, the input activations may be distributed to the processing elements of the die via the network-on-a-chip router of the die.

Once the processing elements 306 receive the input activations, the processing elements 306 may utilize the weights stored in their weight buffer to generate the output activations. These output activations may then be sent back to the global buffer 308 of each die for staging between network layers, by a similar process detailed above but in reverse order.

FIG. 8 illustrates an exemplary interconnect 102 between the third die 706 and the fourth die 708. The interconnect 102 depicted is between a transmitter of the fourth die 708 and a receiver of the third die 706. The transmitter and the receiver may comprise data, clock, ground (GND) and supply (VDD) pins. The data pins of the transceiver may be coupled to the data pins of the receiver to form data lanes. The clock pins of the transceiver may be coupled to the clock pins of the receiver to form clock lanes. In one embodiment, there are four data lanes and one clock lane. The four data lanes and the clock lane may run at about 25 Gbps/pin, for a total bandwidth of about 768 Gbps (about 384 Gbps inbound and about 384 Gbps outbound) and bandwidth density of about 369 Gbps/mm$^2$. In another embodiment, the interconnect 102 may transmit at about 12.5 GB/s bandwidth on an about 3 mm-7 mm trace. These are of course only examples.

The multi-die package 302 leverages the locality of DNN algorithms. Computation by the DNN layers may be tiled both spatially and temporally across multiple dice and multiple processing elements 306 to maximize utilization of the multiply-accumulate units 502, maximize performance, minimize power consumed, or any balance of these factors, depending on the requirements of the implementation. The particular tiling and data flow may be determining by setting one or more of the configurable values discussed in conjunction with FIG. 6.

FIG. 9 through FIG. 12 depict an embodiment of convolution tiling 900 that may be utilized. This depiction is merely one example to illustrate the flexibility of the tiling possibilities.

Generally, convolution of the input activations 902 with the weights 904 is performed to generate the output activations 906. The input activations 902 may have a number of input channels, C, as well as an input activation size, H×W. The height, H, and the width, W, may be image pixel dimensions. The depth of the input to the multi-die package 302 (e.g., color depth of an image) may be the channel dimension of the input, C. Each of the weights 904 may have C input channels and a weight kernel size, R×S. The number of weights 904 may equal the number of output channels, K. The output activations 906 may have a number of output channels, K, as well as output activation dimensions, P×Q.

At the package-level, data may be distributed as follows: 1) weights are distributed between different dice along the input channel dimensions (C) and the output channel dimensions (K); 2) input activations are multicast along processing element rows of dice having a matching C dimension; and 3) output activations are reduced along processing element columns of dice. Within each die, weights are tiled similarly along the C and K dimensions of the processing elements 306. Input activations are multicast via the network-on-a-chip router 312. In addition to the C-K tiling illustrated in FIG. 9, the multi-die package 302 may also implement H-W tiling for network layers with a smaller number of input/output channels.

Figure 10:
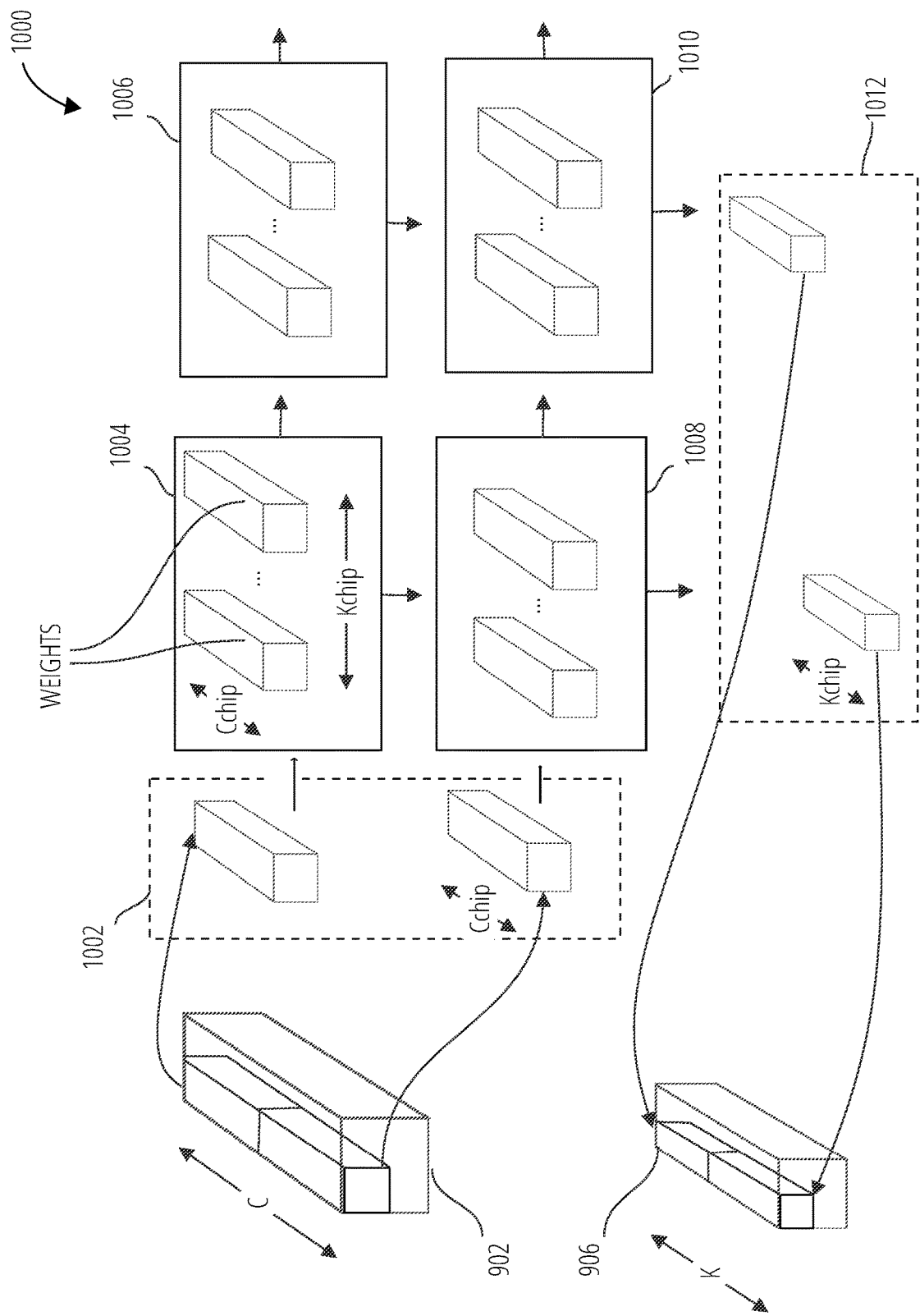
FIG. 10 illustrates a package-level tiling 1000 in greater detail, in accordance with one embodiment.
Figure 11:
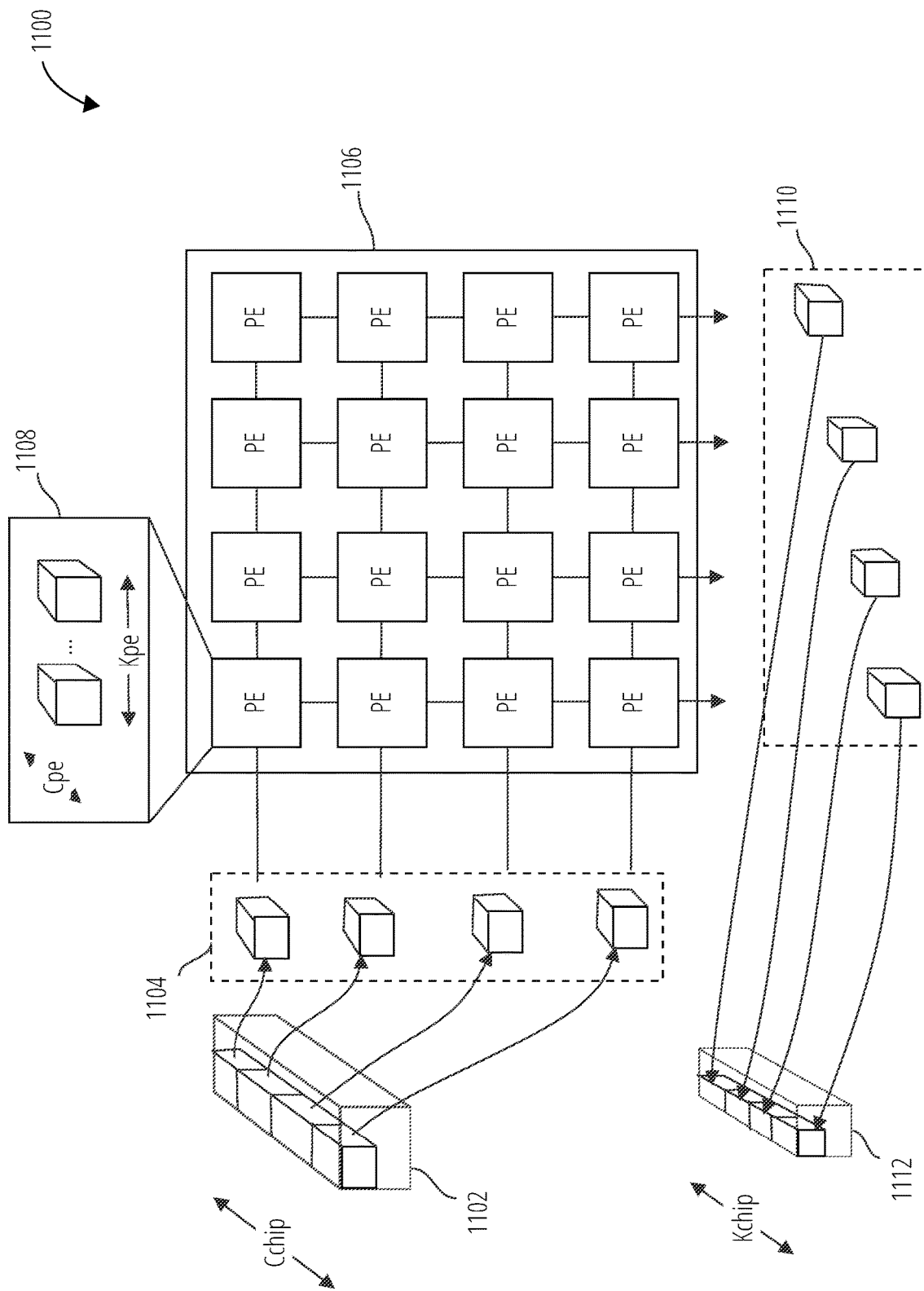
FIG. 11 illustrates a chip-level tiling 1100 in accordance with one embodiment.
Figure 12:
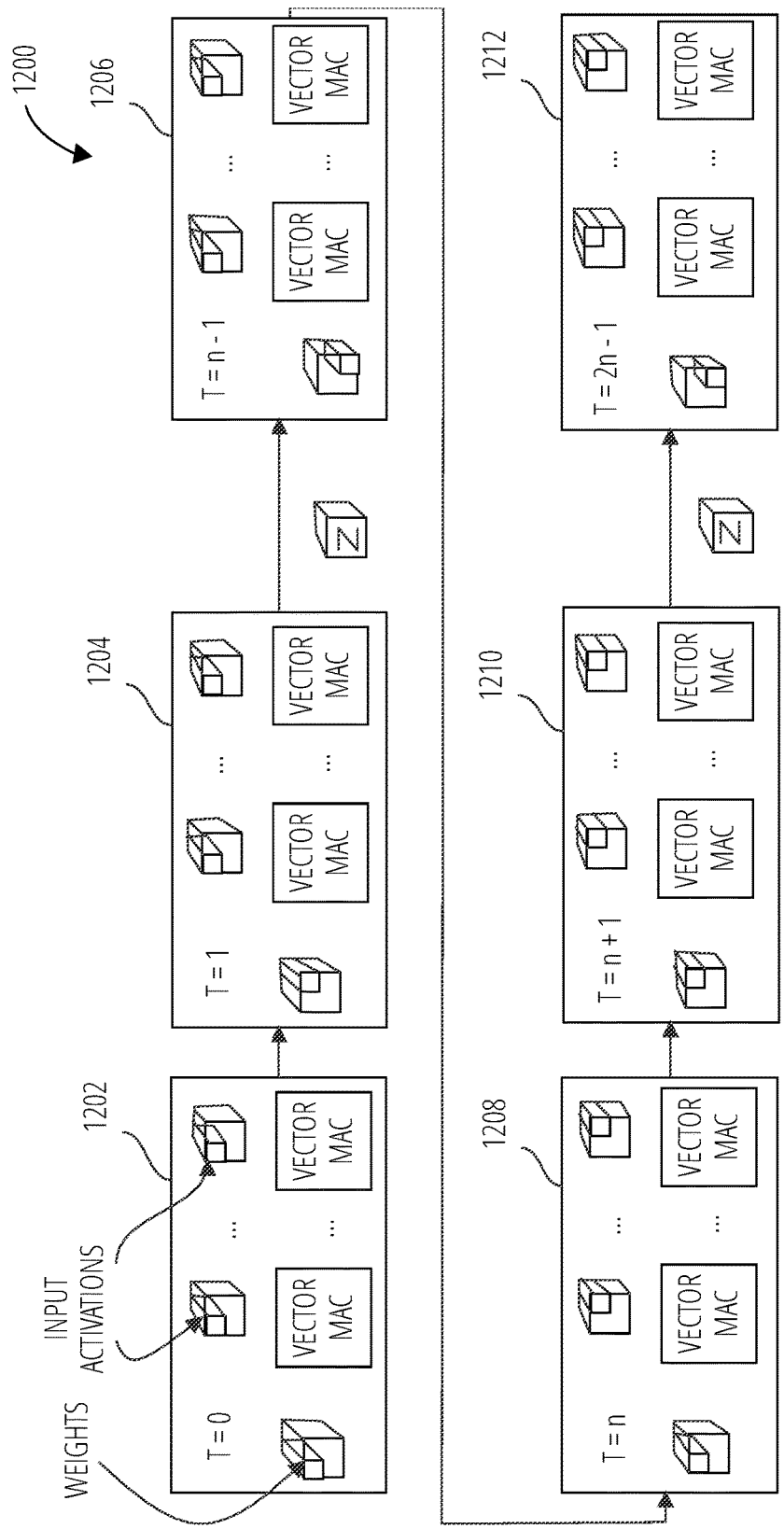
FIG. 12 illustrates a processing element-level tiling 1200 in accordance with one embodiment.

Referring now to FIG. 10-FIG. 12, a package-level tiling 1000 depicts input activations applied to weights across various chips (chip 1004, chip 1006, chip 1008, and chip 1010).

The overall input activations 902 may be tiled into the plurality of chip input activations 1002. Each of the chip input activations 1002 are processed through a K-deep pipeline formed by a row of processing elements of a chip, each storing a set of weights. When K, the input depth, exceeds the number of processing elements in one chip row (Kchip), an extended row of processing elements is formed spanning multiple chips (chip 1004, chip 1006, . . . ).

Each row of processing elements in each chip may only generate a partial portion of the output activation dot product. In this case the partial products are passed to adjacent processing elements in the same column of the chip. If the width of the dot product is such that the number of partial products exceeds the number of rows in one chip, the processing elements in the last row of the chip pass their partial results to processing elements in an adjacent chip, forming an extended dot product calculation column. The outputs of the last processing element of each column are the chip output activations 1012 that are combined to generate the final output activations 906.

Referring to FIG. 11, a chip-level tiling 1100 comprises a chip input activation 1102, processing element input activations 1104, a chip 1106, processing element weights 1108, processing element output activations 1110, and a chip output activation 1112.

The chip 1106 may receive a number of processing element input activations 1104, $C_{chip}$, from the chip input activation 1102. The number $C_{chip}$ corresponds to a number of rows of the chip 1106. Each of the processing element input activations 1104 are applied to a different row of processing elements on the chip 1106, where they may be processed by $K_{pc}$ multiply-accumulate units.

The chip 1106 has a number of processing elements (e.g., 16). Each processing element stores a portion of the processing element weights 1108, for example a portion corresponding to a particular convolution filter window.

Each column of processing elements (there are $K_{chip}$ such columns in the chip 1106) generates one of the processing element output activations 1110, each being a portion of the chip output activation 1112. The processing element output activations 1110 are combined to generate the final chip output activation 1112. Each processing element may utilize a temporal processing element-level tiling 1200 of the input activations as depicted in FIG. 12 to generate a portion of one of the processing element output activations 1110.

Referring to FIG. 12, a processing element-level tiling 1200 comprises a temporal tile 1202, a temporal tile 1204, a temporal tile 1206, a temporal tile 1208, a temporal tile 1210, and a temporal tile 1212—in other words, a temporal progression. Each tile of the temporal progression shows a pairing of input activations and weights for dot product/partial sum calculation by the vector MAC units in a particular PE at a different clock cycle. "Partial sum" refers to an intermediate multiply-accumulate result in a dot-product-accumulate calculation.

The multiply-accumulate units of the processing element compute a portion of a wide dot-product-accumulate as a partial result and store the partial result in the accumulation memory buffer, or forward the partial result to neighboring processing elements. "Accumulation memory buffer" refers to a memory buffer utilized to store computational results of one or more multiply-accumulate units. The partial results are transformed into a final result by the processing elements and communicated to the global buffer. The global buffer may stage the final results between layers of the deep neural network.

The temporal tile 1202 depicts a number of calculations performed at time, T=0. A first portion of the processing element input activation is convolved with a first portion of the processing element weights. The temporal tile 1204 is a number of number of calculations performed at time, T=1. A second portion of the processing element input activation is convolved with the first portion of the processing element weights. This process continues for each portion of the processing element input activation until, in the temporal tile 1206 at T=n−1, all portions of the processing element input activation have been convolved with a first portion of the processing element weights. The value "n" may correspond to the number of portions into which the processing element input activation is divided. In one embodiment, the processing element input activation may be divided into a number of rows and columns and each row, column iteration is calculated during one clock cycle, with a next iteration computed during the next clock cycle.

Once the iterations for the processing element input activation is completed for the first portion of the processing element weights, the processing element-level tiling 1200 iterates on the processing element input activation with a second portion of the processing element weights (the temporal tile 1208, the temporal tile 1210, and the temporal tile 1212). The temporal tile 1208 is a number of calculations performed at time, T=n. The first portion of the processing element input activation is convolved with the second portion of the processing element weights. The temporal tile 1210 is a number of calculations performed at time, T=n+1. The second portion of the processing element input activation is convolved with the second portion of the processing element weights. This process continues for each portion of the processing element input activation until, in the temporal tile 1212 at T=2n−1, the last portion of the processing element input activation is convolved with the second portion of the processing element weights. The processing element input activation may be iterated similar to that as performed for the first portion of the processing element weights. The processing element-level tiling 1200 may continue until each portion of processing element input activation is completed for each portion of the processing element weights.

Various logic functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on.

"Logic" is used herein to machine memory circuits, non transitory machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the invention as claimed.

What is claimed is:

1. A semiconductor package comprising:
    a plurality of dice each comprising:
        a central controller;
        a global memory buffer; and
        a plurality of processing elements each comprising:
        a weight buffer to receive from the central controller weight values for a neural network;
        an activation buffer to receive activation values for the neural network;
        an accumulation memory buffer to collect partial sum values;
        a plurality of multiply-accumulate units to combine, in parallel, the weight values and the activation values into the partial sum values, each of the multiply-accumulate units comprising:
        a weight collection buffer disposed in a data flow between the multiply-accumulate unit and the weight buffer; and
        a partial sum collection buffer disposed in the data flow between the multiply-accumulate unit and the accumulation memory buffer.

2. The semiconductor package of claim 1, further comprising:
    logic to distribute the weight values and the activation values among the processing elements spatially by a depth of an input of the neural network, and temporally by a height and a width of the input to the neural network.

3. The semiconductor package of claim 2, wherein the height and the width are image dimensions.

4. The semiconductor package of claim 1, wherein the multiply-accumulate units of each processing element compute a portion of a wide dot-product-accumulate as a partial result and forward the partial result to neighboring processing elements.

5. The semiconductor package of claim 4, where the partial results are transformed into a final result by the processing elements and communicated to the global buffer.

6. The semiconductor package of claim 5, further comprising:
    the global buffer staging the final result between layers of the neural network.

7. The semiconductor package of claim 1, further comprising logic to utilize the global memory buffer as a second-level buffer for the activation values.

8. A semiconductor chip comprising:
    a plurality of processing elements;
    a global memory buffer;
    at least one controller to distribute weights and activations for layers of a neural network spatially across the processing elements by input output channel dimensions and temporally by input height and width;

the at least one controller to utilize the global memory buffer as a second-level buffer for the activations;

at least one multiply-accumulate unit comprising:
    a weight collector disposed in a data flow between (i) a weight buffer configured to receive and store the weights from the controller and (ii) the multiply-accumulate unit; and
    an accumulation collector disposed in the data flow between the multiply-accumulate unit and an accumulation memory buffer.

9. The semiconductor chip of claim 8, wherein each processing element is configured to:
    compute a portion of a dot-product-accumulate value and to forward the portion of the dot-product-accumulate value to neighboring processing elements for final accumulation; and
    communicate results of the final accumulation to the global memory buffer for staging between the layers of the neural network.

10. The semiconductor chip of claim 8, comprising logic to multicast one or both of the weights and the activations to the processing elements.

11. The semiconductor chip of claim 8, each processing element comprising:
    an activation buffer configured to receive and to store the activations from the controller; and
    wherein the weight buffer and the activation buffer each comprise a configurable address generator to enable different data flow computations by the multiply-accumulate units.

12. The semiconductor chip of claim 8, wherein a depth of the weight collector and a depth of the accumulation collector are configurable by the controller.

13. The semiconductor chip of claim 8, wherein a number N of the at least one multiply-accumulate units to make operational is configurable by the controller.

14. The semiconductor chip of claim 8, wherein a number V of multiplications and additions by the at least one multiply-accumulate unit per clock cycle is configurable.

15. A semiconductor neural network processor, comprising:
    a plurality of chips, each chip comprising a plurality of processing elements;
    each of the processing elements comprising:
        a plurality of multiply-accumulate units;
        an accumulation memory buffer;
        a weight buffer;
        each multiply-accumulate unit comprising:
        a weight collector of configurable depth disposed in a data flow between the weight buffer and each multiply-accumulate unit; and
        an accumulation collector of configurable depth disposed in a data flow between each multiply-accumulate unit and the accumulation memory buffer.

16. The semiconductor neural network processor of claim 15, the weight buffer having a configurable operational size.

17. The semiconductor neural network processor of claim 15, the accumulation memory buffer having a configurable operational size.

18. The semiconductor neural network processor of claim 15, wherein a number of operational multiply-accumulate units for the processing elements is configurable.

19. The semiconductor neural network processor of claim 15, each processing element further comprising an activation buffer of configurable operational size.

* * * * *